US011475762B2

(12) United States Patent
Shintani et al.

(10) Patent No.: US 11,475,762 B2
(45) Date of Patent: Oct. 18, 2022

(54) WALKING AID SYSTEM

(71) Applicant: TOYOTA JIDOSHA KABUSHIKI KAISHA, Aichi-ken (JP)

(72) Inventors: Kohei Shintani, Nisshin (JP); Hiroaki Kawamura, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/478,962

(22) Filed: Sep. 20, 2021

(65) Prior Publication Data

US 2022/0189291 A1 Jun. 16, 2022

(30) Foreign Application Priority Data

Dec. 15, 2020 (JP) ............................ JP2020-207866

(51) Int. Cl.
*G08G 1/005* (2006.01)
*G06K 9/62* (2022.01)

(52) U.S. Cl.
CPC .................................... *G08G 1/005* (2013.01)

(58) Field of Classification Search
None
See application file for complete search history.

(56) References Cited

U.S. PATENT DOCUMENTS

2008/0123902 A1* 5/2008 Park ..................... G06V 20/588 382/104
2019/0307632 A1* 10/2019 Yashiro ..................... A61F 9/08
2021/0369545 A1* 12/2021 Ghosh .................. G06K 9/6267

FOREIGN PATENT DOCUMENTS

JP H935180 A 2/1997
WO 2018025531 A1 2/2018

* cited by examiner

*Primary Examiner* — John F Mortell
(74) *Attorney, Agent, or Firm* — Hauptman Ham, LLP

(57) ABSTRACT

An image area including a traffic light in an image taken by a camera is determined, and the determined image area including the traffic light is extracted and the extracted image area is subjected to enlargement processing to determine whether a status of the traffic light is red or green, and notice to start crossing is provided to a user under a condition that the status of the traffic light switches from red to green. Consequently, even with image information from a single camera alone, accuracy in recognition of the traffic light can sufficiently be enhanced. As a result, crossing start notice can properly be provided without an increase in configuration complexity and weight of the system.

5 Claims, 9 Drawing Sheets

WALKING AID SYSTEM

CROSS-REFERENCE TO RELATED APPLICATION

This application claims priority to Japanese Patent Application No. 2020-207866 filed on Dec. 15, 2020, incorporated herein by reference in its entirety.

BACKGROUND

1. Technical Field

The present disclosure relates to a walking aid system. In particular, the present disclosure relates to an improvement of a system that provides notice to start crossing a crosswalk to a user.

2. Description of Related Art

As a system that provides notice to start crossing a crosswalk to a user such as a visually impaired person so that the user can cross the crosswalk safely (walking aid system), one disclosed in WO2018/025531 is known. WO2018/025531 discloses that: a direction determination section that determines a direction in which a person who acts without using the sense of vision (visually impaired person) walks and a guide information generation section that generates guide information for the visually impaired person to walk in the determined direction are provided; and a direction in which the visually impaired person walks is determined via matching between an image from a camera carried by the visually impaired person and a reference image stored in advance and the visually impaired person is guided in the walking direction via, e.g., sound.

SUMMARY

In a situation in which a user (e.g., a visually impaired person) is actually approaching a crosswalk, a position at which the user should stop is a position just short of the crosswalk. Also, a timing for the user to cross the crosswalk is a timing of a traffic light (for example, a pedestrian traffic light) being green. Therefore, in order to properly provide crossing start notice to the user (notice to walk to the position just short of the crosswalk and subsequent crossing start notice), it is necessary to accurately recognize a position of the crosswalk (for example, a position of a nearest white line of the crosswalk) and a status of the traffic light (a green light or a red light) via information from an image acquisition section such as a camera.

Then, when the user has reached the position just short of the crosswalk, the nearest white line in the crosswalk is located in the vicinity of (a position a little ahead of) the feet of the user. The position of the white line is a position that is relatively close to the user and is on the lower side (obliquely lower side) as viewed from the user and is also a position that is relatively close to the camera carried by the user (camera that takes an image of an area ahead in a direction in which the user walks) and is on the lower side from the camera. On the other hand, when the user has reached the position just short of the crosswalk and stopped, a traffic light that should be recognized is a traffic light installed at a spot that is a destination of the crossing (traffic light installed at a position across the crosswalk). A position of the traffic light is a position that is relatively far from the user and is also relatively far from the camera carried by the user.

Therefore, in order to take an image including both the white line (nearest white line) of the crosswalk and the traffic light with the single camera carried by the user, the camera needs to be a wide-angle camera. However, in the image taken by the wide-angle camera, an area occupied by the traffic light in the entire image is small, and thus, it is difficult to determine a status of the traffic light from information of the image and no sufficient accuracy in recognition of the traffic light can be ensured.

If the camera carried by the user is a narrow-angle camera and the traffic light is taken by the camera, the area occupied by the traffic light in the entire image is large, enabling sufficient enhancement of accuracy in recognition of the traffic light. However, with the narrow-angle camera, it is impossible to take an image including both the traffic light and the white line (nearest white line) of the crosswalk. Therefore, a camera for taking an image of the white line is needed separately from a camera that takes an image of the traffic light, causing the problem of an increase in burden on the user due to an increase in configuration complexity and weight of the system.

The present disclosure has been made in view of the aforementioned points and an object of the present disclosure is to provide a walking aid system that while enabling recognition of a nearest white line of a crosswalk and a traffic light via a single image acquisition section, enables providing sufficient accuracy in recognition of a traffic light and that is capable of properly providing crossing start notice to a user.

In order to achieve the above object, a solution of the present disclosure provides a walking aid system that at least provides notice to start crossing (crossing start notice) to a user for the user to cross a crosswalk. The walking aid system includes an image acquisition section, a determination section, an image processing section, a traffic light determination section, a switching recognition section and a notification section. The image acquisition section is capable of acquiring an image including both a white line closest to the user from among white lines of the crosswalk and a traffic light located ahead of the user when the user reaches the crosswalk. The determination section determines an image area including the crosswalk and an image area including the traffic light in the image acquired by the image acquisition section. The image processing section extracts the image area including the traffic light, the image area being determined by the determination section, and performs enlargement processing of the extracted image area. The traffic light determination section determines whether or not a status of the traffic light is a stop instruction state or a crossing permission state from information of the image area including the traffic light, the image area being subjected to the enlargement processing by the image processing section. The switching recognition section recognizes switching of the status of the traffic light, the status being determined by the traffic light determination section, from the stop instruction state to the crossing permission state. The notification section provides notice to start crossing to the user under a condition that the status of the traffic light, the status being recognized by the switching recognition section, switches from the stop instruction state to the crossing permission state.

The above specifying matters allow the image acquisition section to, in a situation in which a user stops at a position just short of a crosswalk, acquire an image including both a white line closest to the user from among white lines of the crosswalk and a traffic light located ahead of the user. Information of the image is transmitted to the determination section, and the determination section determines an image area including the crosswalk and an image area including the traffic light in the image. Then, the image processing section extracts the determined image area including the traffic light and performs enlargement processing of the extracted image area. An area occupied by the traffic light in the entire image is enlarged by the extraction and the enlargement processing, and thus, it becomes easy to determine a status of the traffic light from the information of the image, enabling sufficient enhancement of accuracy in recognition of the traffic light.

Then, the traffic light determination section determines whether the status of the traffic light is a stop instruction state or a crossing permission state, from information of the image area including the traffic light, the image area being subjected to the extraction and the enlargement processing. Upon recognition of switching of the status of the traffic light from the stop instruction state to the crossing permission state, the switching recognition section transmits a signal of the recognition to the notification section. Upon reception of the signal, the notification section provides notice to start crossing to the user. In other words, notice to start crossing is provided to the user under the condition that the status of the traffic light switches from the stop instruction state to the crossing permission state. Therefore, when the user crosses the crosswalk, time during which the status of the traffic light is the crossing permission state can sufficiently be secured.

The present solution, while enabling acquiring an image including both a white line closest to the user from among the white lines of the crosswalk and the traffic light located ahead of the user with the image acquisition section (single image acquisition section), enables sufficient enhancement of accuracy in recognition of the traffic light via the extraction and the enlargement processing of the image area including the traffic light by the image processing section. Therefore, it is possible to properly provide crossing start notice to the user without an increase in configuration complexity and weight of the system.

Also, the walking aid system may include a white line recognition section that recognizes the white lines of the crosswalk in the image area including the crosswalk, the image area being determined by the determination section. The notification section may provide notice to stop walking to the user under a condition that a position of a nearest white line of the crosswalk from among the white lines recognized by the white line recognition section reaches a position that is a predetermined distance from the user.

Consequently, it is possible to provide notice to stop walking at a timing of the user reaching a predetermined position just short of the crosswalk, enabling reliably making the user stop just short of the crosswalk.

Also, the white line recognition section may be configured to, when a width dimension of a white line in the image acquired by the image acquisition section exceeds a predetermined dimension, recognize the white line as a white line of the crosswalk to be crossed by the user.

According to the above, even where there are a plurality of crosswalks, respective directions of crossing the crosswalks being different from each other, at, e.g., an intersection of roads, it is possible to clearly distinguish between the crosswalk to be crossed by the user (crosswalk recognized as a width dimension of a white line in the image acquired by the image acquisition section being relatively large based on the point that the white line extends in a direction crossing the direction in which the user crosses the crosswalk) and another crosswalk (crosswalk recognized as a width dimension of a white line in the image acquired by the image acquisition section being relatively small), enabling correctly providing notice to start crossing to the user with high accuracy.

Also, the walking aid system may include a storage section that stores a first state transition function for determining whether or not a condition for providing notice to stop walking at a position just short of the crosswalk to the user who is in a walking state is met, a second state transition function for determining whether or not a condition for providing notice to start crossing the crosswalk to the user who is in a stop state at the position just short of the crosswalk is met, a third state transition function for determining whether or not a condition for providing warning of deviation from the crosswalk to the user who is in a state of crossing the crosswalk is met, and a fourth state transition function for determining whether or not a condition for providing notice of completion of crossing the crosswalk to the user who is in a state of crossing the crosswalk is met. The notification section may be configured to, when the condition according to any of the state transition functions is met, provide notice according to the met condition to the user.

In other words, when it is determined by the first state transition function that the condition for providing notice to stop walking is met, the notification section provides notice to stop walking to the user who is in a walking state. Also, when it is determined by the second state transition function that the condition for providing notice to start crossing the crosswalk is met, the notification section provides notice to start crossing the crosswalk to the user who is in a stop state at the position just short of the crosswalk. Also, when it is determined by the third state transition function that the condition for providing warning of deviation from the crosswalk is met, the notification section provides warning of deviation from the crosswalk to the user who is in a state of crossing the crosswalk. Also, it is determined by the fourth state transition function that the condition for providing notice of completion of crossing the crosswalk, the notification section provides notice of completion of crossing the crosswalk to the user who is in a state of crossing the crosswalk. These operations enable properly providing respective notices to the user when the user crosses the crosswalk.

Also, the notification section may be incorporated in a white cane that a visually impaired person uses and may be configured to provide notice to the visually impaired person using the white cane via vibration or sound.

Consequently, it is possible to, when a visually impaired person who is walking with a white cane crosses a crosswalk, properly provide notice to the visually impaired person.

Also, in a case where the image acquisition section, the determination section, the image processing section, the traffic light determination section, the switching recognition section and the notification section may be each incorporated in the white cane, the walking aid system can be implemented by the white cane alone, enabling provision of the walking aid system that is highly practical.

In the present disclosure, an image area including a traffic light in an image acquired by the image acquisition section is determined, and the determined image area including the traffic light is extracted and enlargement processing of the extracted image area is performed to determine whether a status of the traffic light is a stop instruction state or a crossing permission state, and notice to start crossing is provided to the user under the condition that the status of the traffic light switches from the stop instruction state to the crossing permission state. Therefore, even with image information from the single image acquisition section alone, accuracy in recognition of the traffic light can sufficiently be enhanced. As a result, it is possible to properly provide crossing start notice to the user without an increase in configuration complexity and weight of the system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described below with reference to the drawings. In the present embodiment, a case where a walking aid system according to the present disclosure is incorporated in a white cane that a visually impaired person uses will be described. Note that a user in the present disclosure is not limited to a visually impaired person.

Schematic Configuration of White Cane

Figure 1:
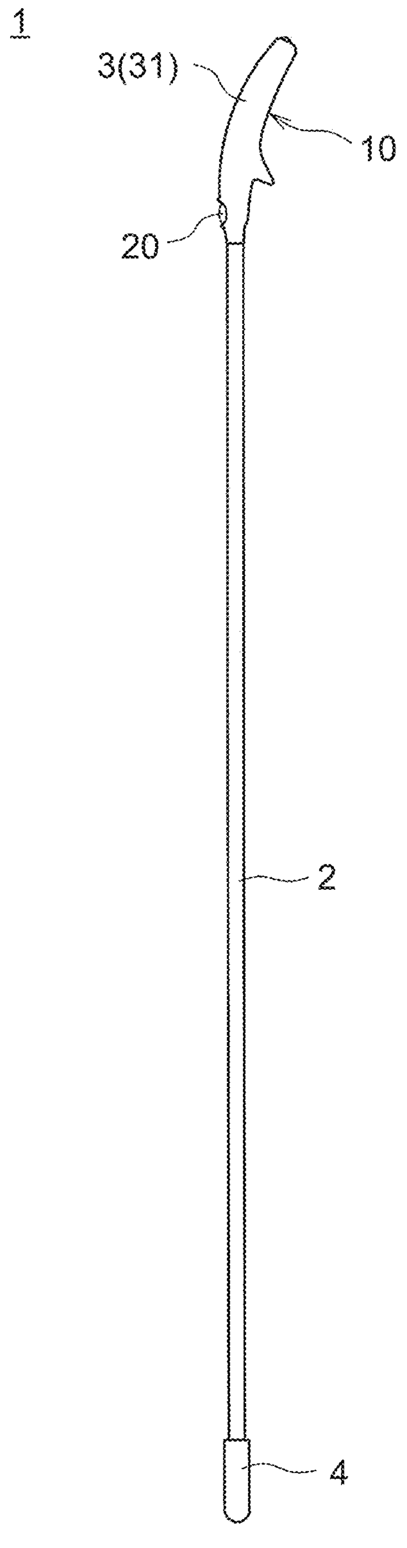
FIG. 1 is a diagram illustrating a white cane with a walking aid system according to an embodiment incorporated therein.

FIG. 1 is a diagram illustrating a white cane 1 with a walking aid system 10 according to the present embodiment incorporated therein. As illustrated in FIG. 1, the white cane 1 includes a shaft portion 2, a grip portion 3 and a tip portion (shoe) 4.

The shaft portion 2 has a hollow rod shape having a substantially circular section and is formed of, e.g., an aluminum alloy, a glass fiber reinforced resin or a carbon fiber reinforced resin.

The grip portion 3 is configured by a cover 31 formed of an elastic body such as rubber being attached to a proximal end portion (upper end portion) of the shaft portion 2. Also, the grip portion 3 of the white cane 1 in the present embodiment has a shape slightly curved toward the distal end side (upper side in FIG. 1) in consideration of ease of grasping and difficulty of slippage when a visually impaired person (user) grasps the grip portion 3.

The tip portion 4 is a substantially tubular bottomed member formed of, e.g., a hard synthetic resin and is fitted on and fixed to a distal end portion of the shaft portion 2 via means such as bonding or screw-fastening. For safety, an end surface on the distal end side of the tip portion 4 has a semispherical shape.

The white cane 1 according to the present embodiment is a non-collapsible straight cane, but may be one that can be collapsed at one or more intermediate positions in the shaft portion 2 or can be extended/retracted.

Configuration of Walking Aid System

A feature of the present embodiment lies in the walking aid system 10 incorporated in the white cane 1. The walking aid system 10 will be described below.

Figure 2:
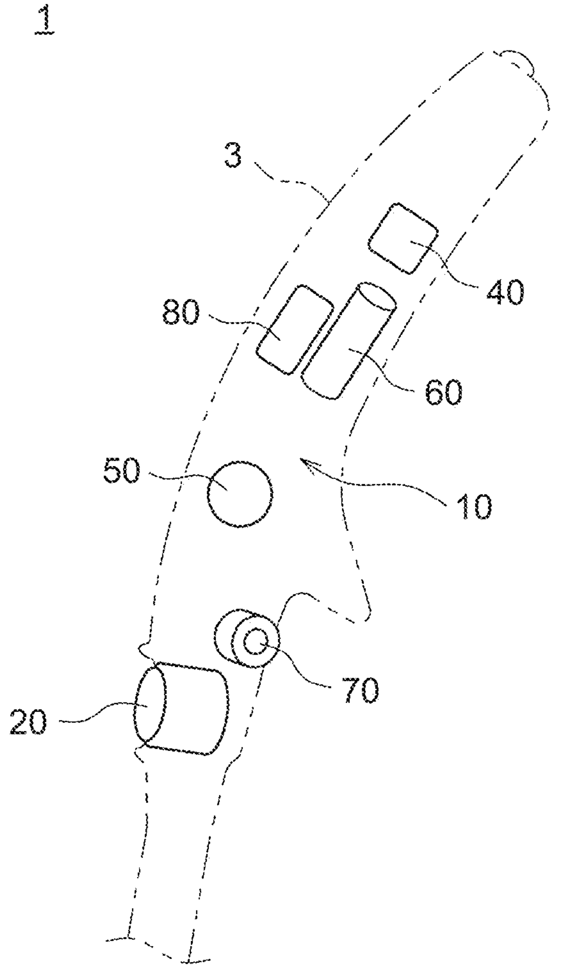
FIG. 2 is a schematic diagram illustrating the inside of a grip portion of the white cane.
Figure 3:
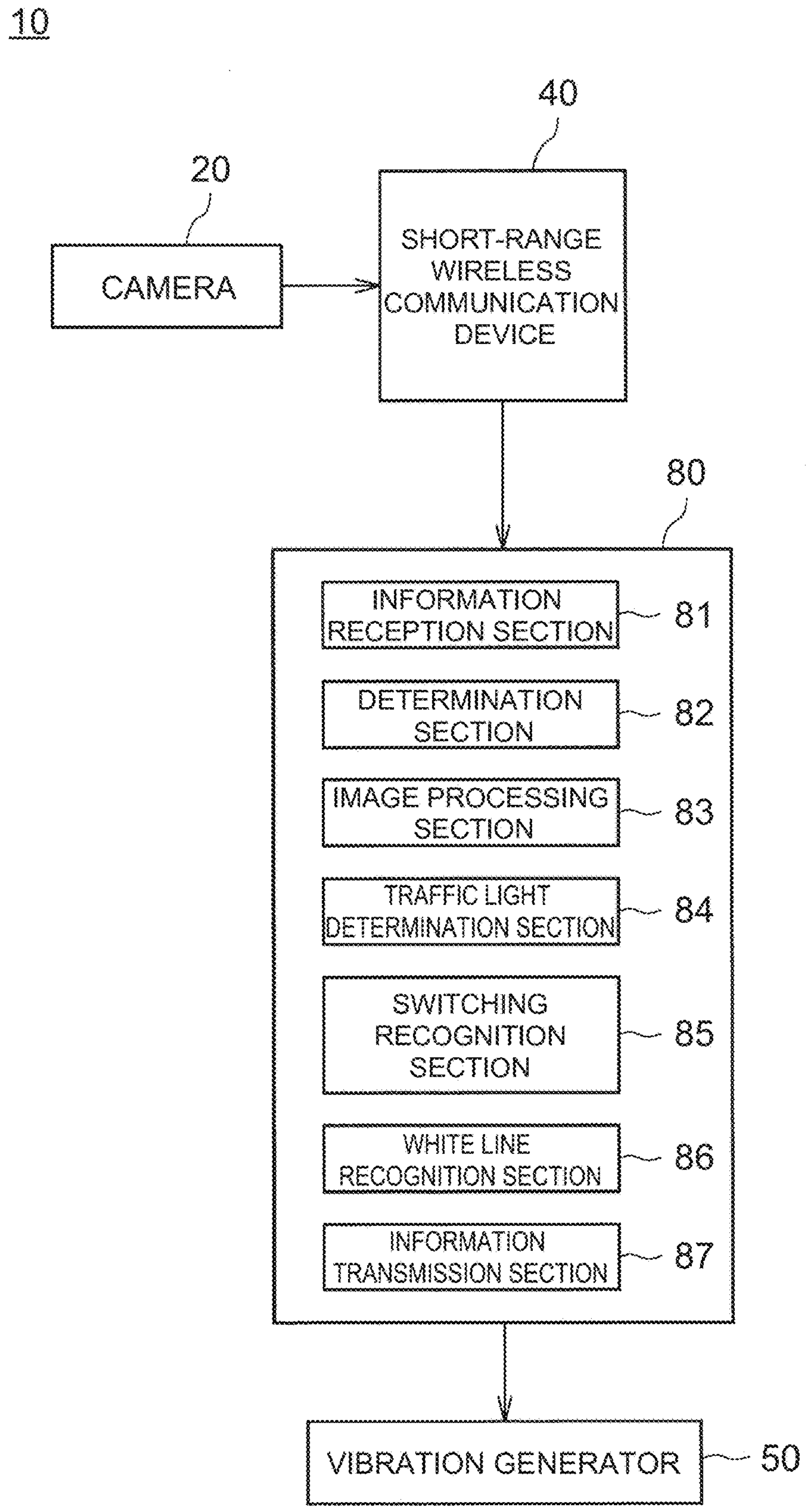
FIG. 3 is a block diagram illustrating a schematic configuration of a control system of a walking aid system.

FIG. 2 is a schematic diagram illustrating the inside of the grip portion 3 of the white cane 1. As illustrated in FIG. 2, the walking aid system 10 according to the present embodiment is incorporated in the white cane 1. FIG. 3 is a block diagram illustrating a schematic configuration of a control system of the walking aid system 10.

As illustrated in these figures, the walking aid system 10 includes, e.g., a camera (image acquisition section) 20, a short-range wireless communication device 40, a vibration generator (notification section) 50, a battery 60, a charging socket 70 and a control device 80.

The camera 20, which is embedded in a front surface (surface facing a travel direction of a visually impaired person) of a root portion of the grip portion 3, takes an image of an area ahead in the travel direction of the visually impaired person. The camera 20 is formed of, for example, a charge-coupled device (CCD) or a complementary metal-oxide-semiconductor (CMOS). Also, the configuration of the camera 20 and the position at which the camera 20 is disposed are not limited to the aforementioned ones but the camera 20 may be embedded in, for example, a front surface (surface facing the travel direction of the visually impaired person) of the shaft portion 2.

As a feature of the camera 20, the camera 20 is configured as a wide-angle camera capable of acquiring an image of an area ahead in a travel direction of a visually impaired person who is walking, the image including both a white line at a position closest to the visually impaired person from among white lines of the crosswalk and a traffic light (for example, a pedestrian traffic light) located ahead of the visually impaired person when the visually impaired person has reached the crosswalk. In other words, the camera 20 is capable of taking an image of both a nearest white line of a crosswalk present in the vicinity of (position a little ahead from) the feet of a visually impaired person at a point of time when the visually impaired person has reached just short of the crosswalk and a traffic light installed at a spot of a destination of crossing. A required view angle of the camera

20 is appropriately set in such a manner as to be capable of taking an image including both a white line (white line of a crosswalk) located at a position closest to a visually impaired person and a traffic light as described above.

The short-range wireless communication device 40 is a wireless communication device for short-range wireless communication between the camera 20 and the control device 80. For example, the short-range wireless communication device 40 is configured to perform short-range wireless communication between the camera 20 and the control device 80 via communication means such as publicly-known Bluetooth (registered trademark) to wirelessly transmit information of an image taken by the camera 20 to the control device 80.

The vibration generator 50 is disposed above the camera 20 in the root portion of the grip portion 3. The vibration generator 50 is capable of providing various notices to a visually impaired person grasping the grip portion 3 by vibrating along with operation of a motor incorporated therein and transmits the vibration to the grip portion 3. Specific examples of the notices to the visually impaired person by vibrations of the vibration generator 50 will be described later.

The battery 60 is formed of a secondary battery that stores electric power for the camera 20, the short-range wireless communication device 40, the vibration generator 50 and the control device 80.

The charging socket 70 is a part to which a charging cable is connected when electric power is stored in the battery 60. For example, a charging cable is connected to the charging socket 70 when the visually impaired person charges the battery 60 from a household power source at home.

The control device 80 includes, e.g., a processor, for example, a central processing unit (CPU), a read-only memory (ROM) that stores a control program, a random-access memory (RAM) that temporarily stores data, and an input/output port.

The control device 80 includes an information reception section 81, a determination section 82, an image processing section 83, a traffic light determination section 84, a switching recognition section 85, a white line recognition section 86 and an information transmission section 87 as functional sections. Overviews of functions of the respective sections will be described below. Details of processing operation in each section will be described later.

The information reception section 81 receives information of an image taken by the camera 20 from the camera 20 via the short-range wireless communication device 40 at predetermined time intervals.

The determination section 82 determines an image area including a crosswalk and an image area including a traffic light in the image in the image formation received by the information reception section 81 (information of an image taken by the camera 20).

The image processing section 83 extracts the image area including a traffic light, which has been determined by the determination section 82, and performs enlargement processing of the extracted image area.

The traffic light determination section 84 determines whether a status of the traffic light is red (stop instruction state) or green (crossing permission state), from the information of the image area including the traffic light, which has been subjected to the enlargement processing by the image processing section 83.

The switching recognition section 85 recognizes that the status of the traffic light determined by the traffic light determination section 84 has switched from red to green. When the switching recognition section 85 has recognized the switching of the traffic light, the switching recognition section 85 transmits a switching signal to the information transmission section 87. The switching signal is transmitted from the information transmission section 87 to the vibration generator 50. In response to reception of the switching signal, the vibration generator 50 vibrates in a predetermined pattern to provide notice to allow crossing a crosswalk because of the traffic light switches from red to green (crossing start notice) to the visually impaired person.

The white line recognition section 86 recognizes the white line of the crosswalk in the image area including the crosswalk, which has been determined by the determination section 82.

Walking Aid Operation

Next, a walking aid operation of the walking aid system 10 configured as described above will be described. First, an overview of the present embodiment will be described.

Overview of Present Embodiment

Here, it is assumed that $t \in [0, T]$ is a time during a visually impaired person walking and $s \in R^T$ is a variable (state variable) representing a state of the visually impaired person. Also, the state variable at a time t is expressed by an integer of $s_t \in [0, 1, 2]$, which represent a walking state ($s_t=0$), a stop state ($s_t=1$) and a crossing state ($s_t=2$). The "walking state" here is assumed to indicate, for example, a state in which the visually impaired person is walking toward an intersection (intersection provided with traffic lights and crosswalks). Also, the "stop state" is assumed to indicate a state in which the visually impaired person has reached just short of a crosswalk and stops and waits for the traffic light to switch (wait for a switch from red to green) (non-walking state). Also, the "crossing state" is assumed to indicate a state in which the visually impaired person is crossing a crosswalk.

The present embodiment provides an algorithm for, upon an input of an image $X_t \in R^{w0 \times h0}$ ($w_0$ and $h_0$ each represent vertical and horizontal sizes of the image) taken by the camera 20 at the time t, obtaining an output $y \in R^T$ intended to aid a visually impaired person's walking. Here, an output for aiding a visually impaired person's walking is expressed by an integer of $y_t \in [1, 2, 3, 4]$, which represents a stop instruction ($y_t=1$), a walk instruction ($y_t=2$), a right deviation warning ($y_t=3$) and a left deviation warning ($y_t=4$). In the below description, "stop instruction" may be referred to "stop notice". Also, "walk instruction" may be referred to as "walk notice" or "crossing notice". These instructions (notices) and warnings are provided to the visually impaired person via respective patterns of vibration of the vibration generator 50. The visually impaired person understands a relationship between the instructions and warnings and the patterns of vibration of the vibration generator 50 in advance, and recognizes a type of an instruction or a warning by perceiving a pattern of vibration of the vibration generator 50 from the grip portion 3.

Also, as described later, there are functions $f_0$, $f_1$, $f_2$ that each determine a transition of a variable s representing the state of the visually impaired person (hereinafter referred to as "state transition function(s)") and a state transition function $f_3$ that determines a deviation from a crosswalk (deviation in a right-left direction), and these state transition functions $f_0$ to $f_3$ are stored on the ROM (storage section in the present disclosure). Specific examples of the state transition functions $f_0$ to $f_3$ will be described later.

Overview of Output Variable y and State Transition Function $f_i$

The aforementioned output $y_t \in [1, 2, 3, 4]$ that aids the visually impaired person's walking will be described.

As described above, as the output $y_t$, there are four kinds of outputs, the stop instruction ($y_t$=1), the walk instruction ($y_t$=2), the right deviation warning ($y_t$=3) and the left deviation warning ($y_t$=4) for aiding the visually impaired person's walking.

Figure 4:
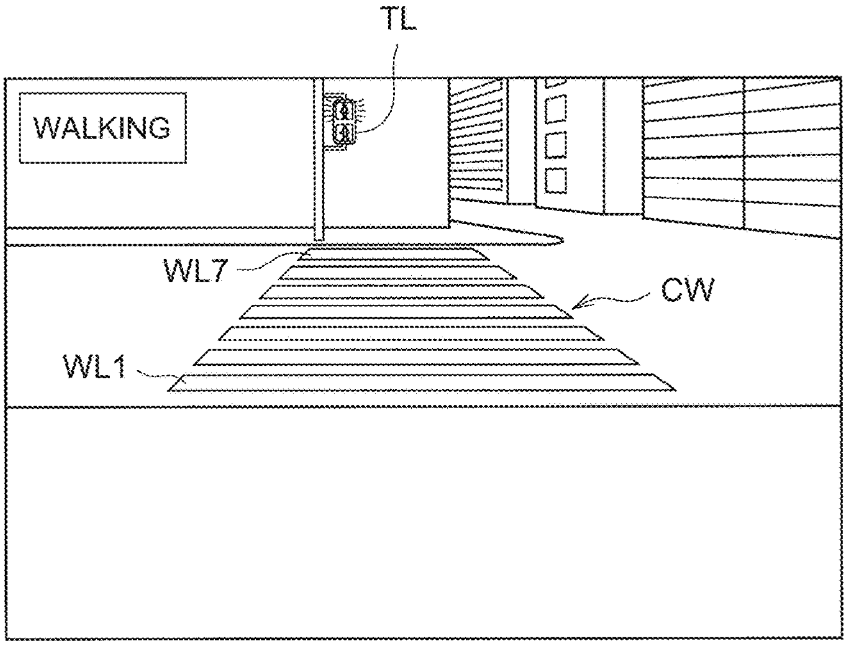
FIG. 4 is a diagram illustrating an example of an image taken by a camera when a visually impaired person was walking toward a crosswalk.

The stop instruction ($y_t$=1) is intended to provide notice to stop walking to the walking visually impaired person at a point of time of the visually impaired person reaching just short of a crosswalk. For example, if an image taken by the camera 20 indicates the state illustrated in FIG. 4 (diagram illustrating an example of an image taken by the camera 20 when the visually impaired person is walking toward a crosswalk CW), no stop instruction ($y_t$=1) is provided because a distance to the crosswalk CW is relatively long. Thus, the visually impaired person continues walking ($s_t$=0). If the image taken by the camera 20 indicates the state illustrated in FIG. 5 (diagram illustrating an example of an image taken by the camera 20 at a timing of the visually impaired person reaching the crosswalk CW), since the visually impaired person has reached just short of the crosswalk CW, the stop instruction ($y_t$=1) is output to provide notice to stop walking to the visually impaired person. Determination of whether or not a condition for providing a stop instruction ($y_t$=1) is met (determination based on a result of calculation of a state transition function) will be described later.

The walk instruction ($y_t$=2) is intended to provide notice to walk (cross the crosswalk CW) to the visually impaired person in response to switching of the traffic light TL from red to green. For example, when the visually impaired person is in a stop state ($s_{t=1}$) just short of the crosswalk CW, if it is detected based on the image taken by the camera 20 that the traffic light TL switches from red to green, the walk instruction ($y_t$=2) is output to provide notice to start crossing the crosswalk CW to the visually impaired person. Determination of whether or not a condition for providing a walk instruction ($y_t$=2) is met (determination based on a result of calculation of a state transition function) will also be described later.

Then, in the present embodiment, a timing for providing the walk instruction ($y_t$=2) is a timing of switching of the traffic light TL from red to green. In other words, even if the traffic light TL has already turned green at the point of time of the visually impaired person reaching the crosswalk CW, no walk instruction ($y_t$=2) is provided and the walk instruction ($y_t$=2) is provided at a timing of switching of the traffic light TL turning green after turning red once. Consequently, when the visually impaired person crosses the crosswalk CW, it is possible to secure sufficient time of the traffic light TL being green, which makes it unlikely to cause a situation in which the traffic light TL switches from green to red during the visually impaired person crossing the crosswalk CW.

Figure 6:
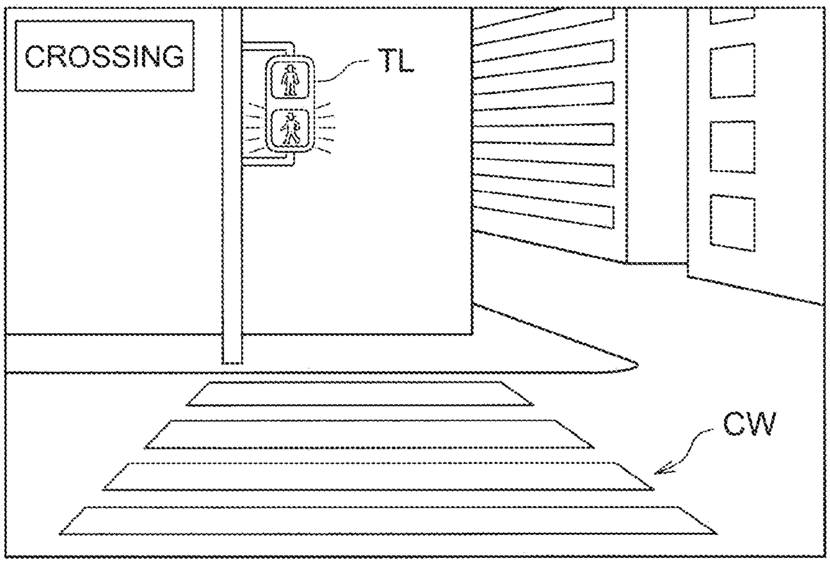
FIG. 6 is a diagram illustrating an example of an image taken by a camera when a visually impaired person was crossing a crosswalk.
Figure 7:
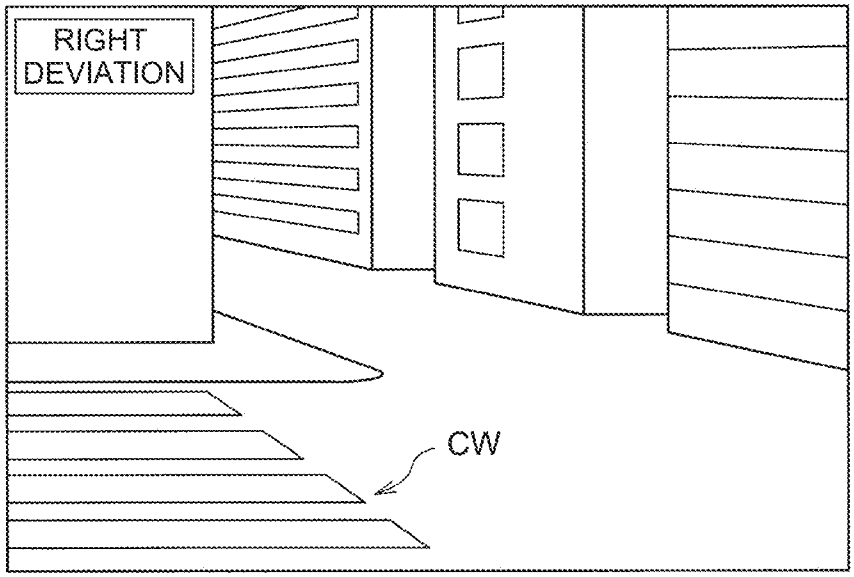
FIG. 7 is a diagram illustrating an example of an image taken by a camera when a visually impaired person was walking in a direction that deviates to the right of the crosswalk during crossing a crosswalk.

The right deviation warning ($y_t$=3) is intended to, when the visually impaired person who is crossing the crosswalk CW is walking in a direction that deviates to the right from the crosswalk CW, to warn that he/she may deviate to the right from the crosswalk CW. For example, in a case where an image taken by the camera 20 indicates the state illustrated in FIG. 6 (diagram illustrating an example of an image taken by the camera 20 when the visually impaired person is crossing the crosswalk CW) and the visually impaired person is crossing the crosswalk CW ($s_t$=2), if the image taken by the camera 20 changes and indicates the state illustrated in FIG. 7 (diagram illustrating an example of an image taken by the camera 20 when the visually impaired person who is crossing the crosswalk CW is walking in a direction that deviates to the right from the crosswalk CW), since the visually impaired person is walking in the direction that deviates to the right from the crosswalk CW, the right deviation warning ($y_t$=3) is output to warn the visually impaired person.

Figure 8:
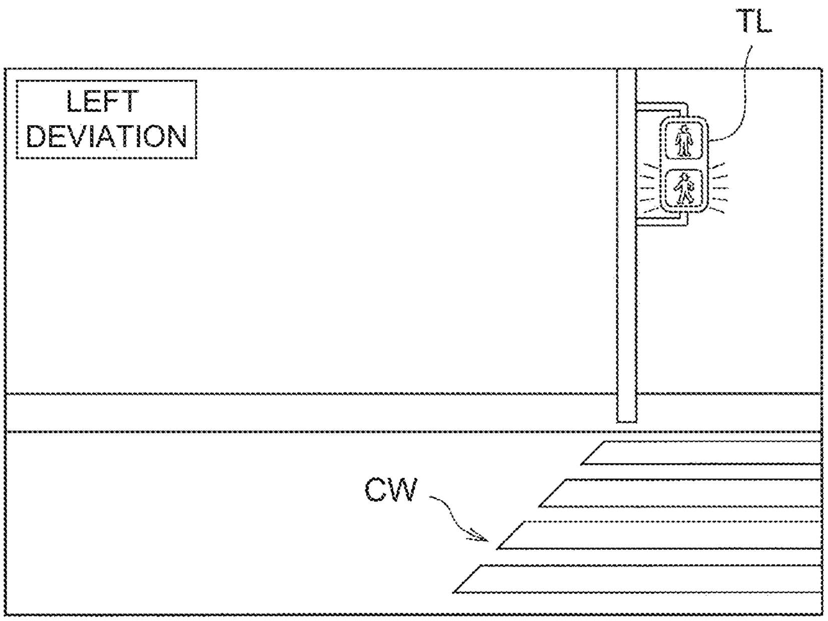
FIG. 8 is a diagram illustrating an example of an image taken by a camera when a visually impaired person was walking in a direction that deviates to the left of the crosswalk during crossing a crosswalk.

The left deviation warning ($y_t$=4) is intended to, when the visually impaired person who is crossing the crosswalk CW is walking in a direction that deviates to the left from the crosswalk CW, warn the visually impaired person that he/she may deviate to the left from the crosswalk CW. For example, in a case where an image taken by the camera 20 indicates the state illustrated in FIG. 6 and the visually impaired person is crossing the crosswalk CW ($s_t$=2), if the image taken by the camera 20 changes and indicates the state illustrated in FIG. 8 (diagram illustrating an example of an image taken by the camera 20 when the visually impaired person who is crossing the crosswalk CW is walking in a direction that deviates to the left from the crosswalk CW), since the visually impaired person is walking in the direction that deviates to the left from the crosswalk CW, the left deviation warning ($y_t$=4) is output to warn the visually impaired person.

Determination of whether or not respective conditions for providing these right deviation warning ($y_t$=3) and left deviation warning ($y_t$=4) are met (determination based on a result of calculation of a state transition function) will be described later.

Extraction and Enlargement processing of Image Area Including Traffic Light

As described above, in the present embodiment, a timing for providing the walk instruction ($y_t$=2) is a timing of the traffic light TL switching from red to green. Also, the camera 20 is a wide-angle one and is capable of taking an image including both a nearest white line WL1 of the crosswalk CW present in the vicinity of the feet of the visually impaired person (see FIGS. 4 and 5) and the traffic light TL installed at the spot of the destination of crossing at the point of time the visually impaired person reaching just short of the crosswalk CW. In an image taken by such wide-angle camera 20, an area occupied by the traffic light TL in the entire image is small, and thus, it is difficult to determine the status of the traffic light TL from information of the image and no sufficient accuracy in recognition of the traffic light TL is ensured.

Therefore, in the present embodiment, an image area including the crosswalk CW in an image taken by the camera 20 is determined (determination operation of the determination section 82), an image area including the traffic light TL is extracted and enlargement processing of the extracted image area (processing by the image processing section 83) is performed. An overview of the processing will be described below.

Figure 5:
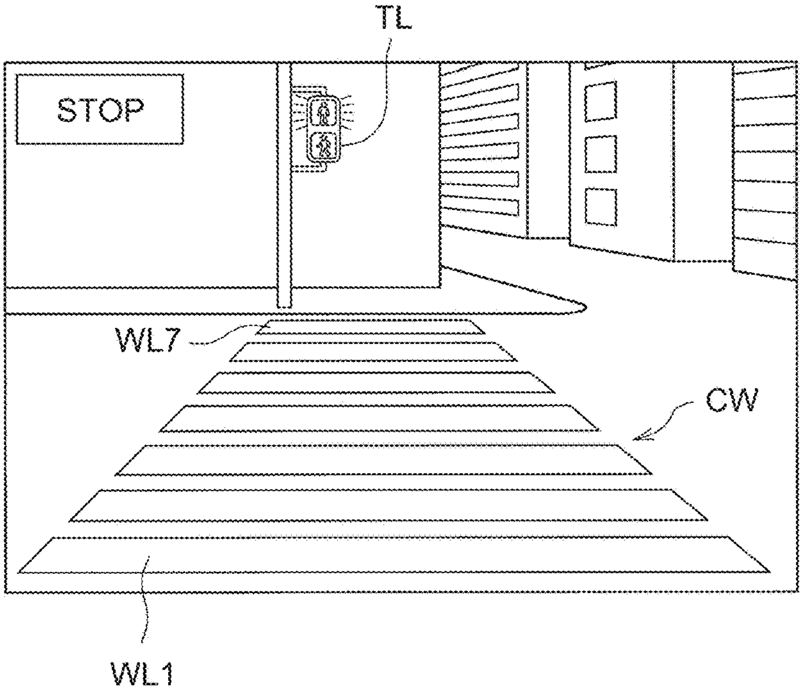
FIG. 5 is a diagram illustrating an example of an image taken by a camera at a timing of a visually impaired person reaching a crosswalk.
Figure 9:
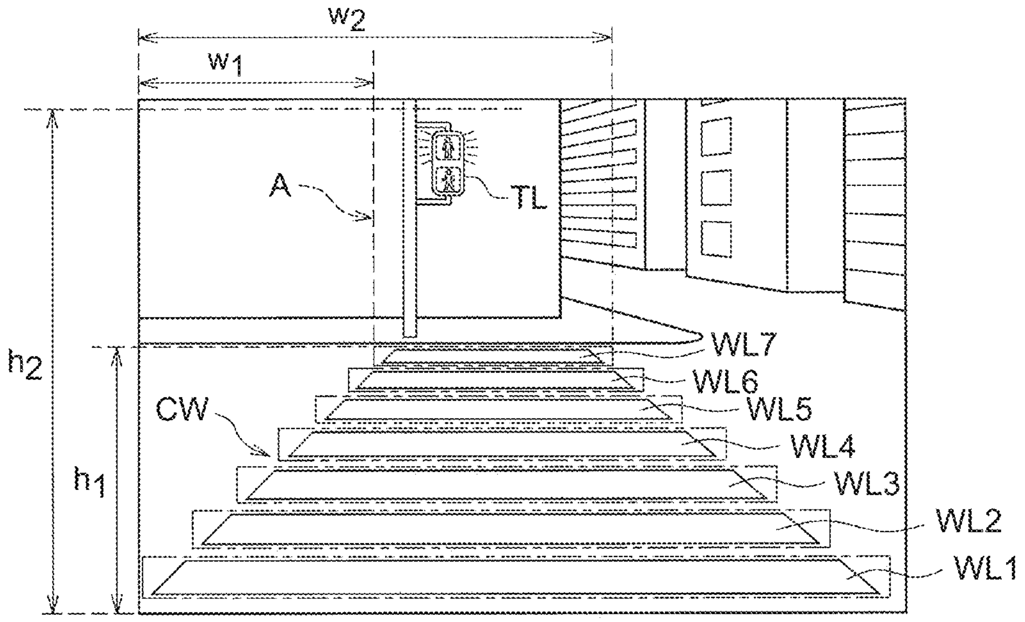
FIG. 9 is a diagram for describing an operation of extraction of an image area including a traffic light.

When the visually impaired person stops just short of a crosswalk CW ($s_t$=1), as an image taken by the camera 20, for example, one illustrated in FIG. 5 is acquired. Then, in the acquired image, as illustrated in FIG. 9, the area to be extracted (clipped) is designated by abscissa-axis lengths (coordinate points) $w_1$, $w_2$ and ordinate-axis lengths (coordinate points) $h_1$, $h_2$ with a left bottom of the image as an origin. In other words, as a result of these lengths being designated, an area A surrounded by dashed lines in FIG. 9, which is an image area including the traffic light TL, is extracted. Each of the lengths will be described more specifically below.

The lengths $w_1$, $w_2$, $h_1$ specify respective coordinates representing positions of a left edge, a right edge and a bottom edge of the extracted area (trimmed image) A. These are defined using coordinates of a left edge, a right edge and an upper edge of an uppermost Boundary Box (Boundary Box surrounding a farthest white line WL7) among Boundary Boxes (boxes surrounded by alternate long and short dash lines in FIG. 9) of the crosswalk, which have been detected by a deep learning model.

The upper edge $h_2$ of the trimmed image (area A) is defined according to an occupancy of the crosswalk CW in the image taken by the camera 20, and as the occupancy in the crosswalk CW is larger, a value of the upper edge $h_2$ is set to be larger. In other words, in a case where the occupancy of the crosswalk CW is large, a height position of the traffic light TL in the image can be assumed to be high, and thus, a value of the upper edge $h_2$ is set to be large and the upper edge $h_2$ of the trimmed image is set at a high position. More specifically, the upper edge $h_2$ is defined as $h_2=\alpha\cdot h_1$ using a coefficient αÅ[1, $h_0/h_1$] by which $h_1$ is multiplied. Consequently, the area A surrounded by dashed lines in FIG. 9 is extracted, the area A is subjected to enlargement processing and the image illustrated in FIG. 10 (image with the area occupied by the traffic light TL enlarged) is thereby obtained. Consequently, it is possible to easily determine the status of the traffic light TL, enabling sufficient enhancement in recognition accuracy of the traffic light TL.

Feature Values Used for Walking Aid

Next, feature values using walking aid for the visually impaired person will be described. In order to properly provide a notice to stop walking just short of the crosswalk CW and various subsequent notices including, e.g., a crossing start notice to the visually impaired person, it is essential to accurately recognize a position of the crosswalk CW (position of the nearest white line WL1 in the crosswalk CW) and the status of the traffic light TL (green or red) from information from the camera 20. In other words, it is necessary to establish a model formula in which the position of the white line WL1 and the status of the traffic light TL are reflected and enable a situation that the visually impaired person is currently in to be understood according to the model formula.

Figure 10:
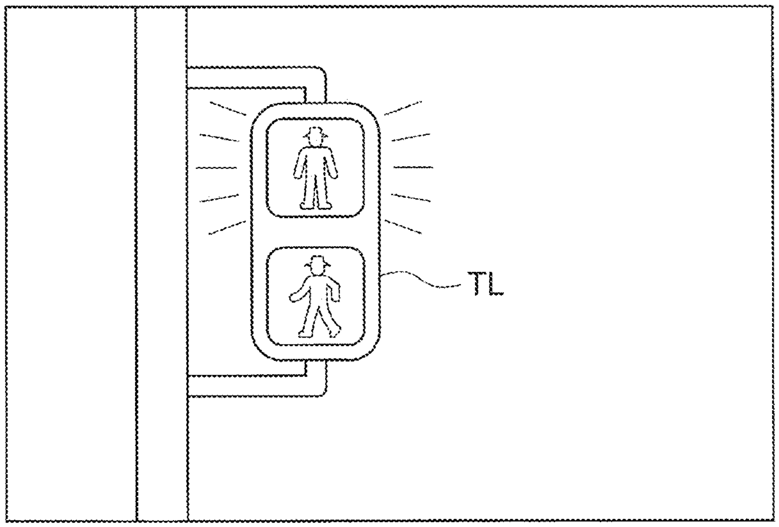
FIG. 10 is a diagram illustrating an example of an image subjected to extraction and enlargement processing.
Figure 11:
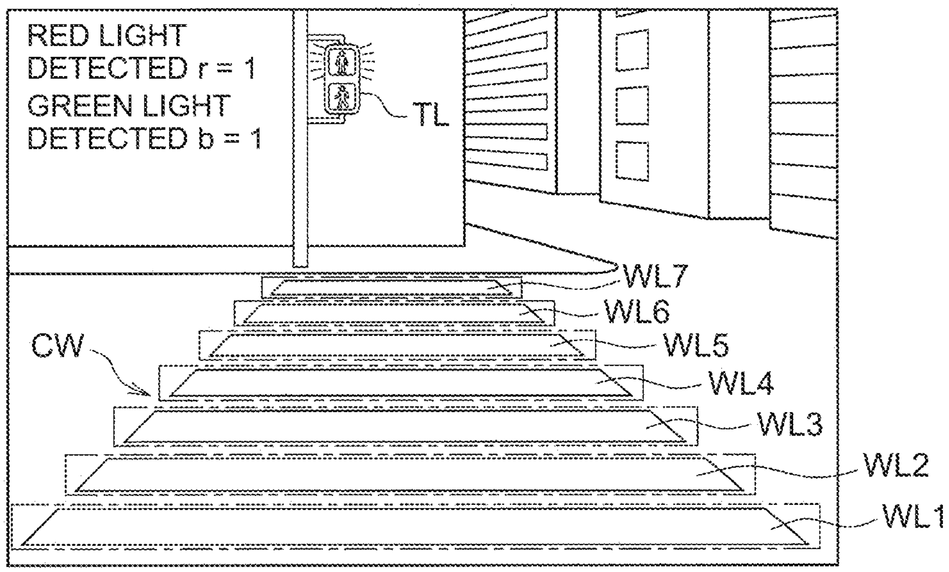
FIG. 11 is a diagram illustrating an image of a crosswalk and a traffic light recognized.
Figure 12:
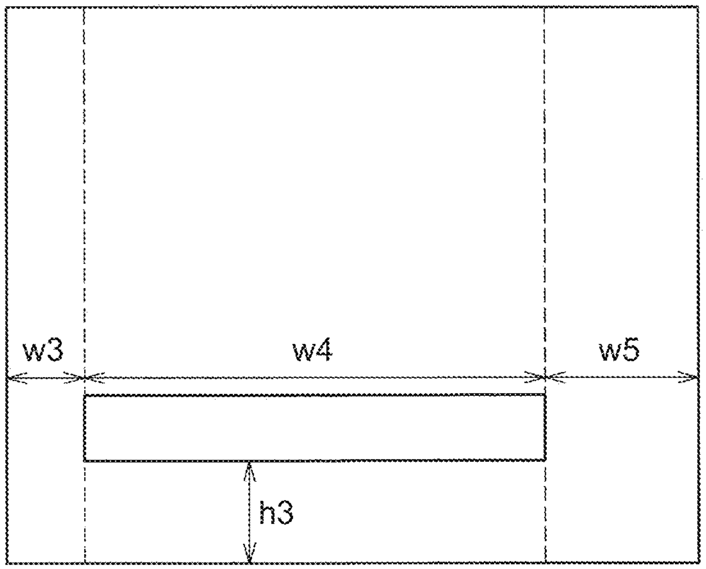
FIG. 12 is a diagram for describing dimensions of respective portions of a white line of the recognized crosswalk in a Boundary Box.

FIGS. 11 and 12 illustrate the outline of a feature value $[w_3, w_4, w_5, h_3, r, b]^T \in R^6$ used for walking aid for a visually impaired person. Signs r and b represent respective results of detection of the status of the traffic light TL (a red light and a green light) (0: undetected, 1: detected). In detection of the status of the traffic light TL, as described above, the area A surrounded by the dashed lines in FIG. 9 is extracted and the area A is subjected to enlargement processing, and then, recognition of the status of the traffic light TL using the image illustrated in FIG. 10 (image with the area occupied by the traffic light TL enlarged) is performed. Also, $w_3$, $w_4$, $w_5$ and $h_3$ are defined as illustrated in FIG. 12 using a Boundary Box for the nearest white line WL1 of white lines WL1 to WL7 of the crosswalk CW, which have been recognized by the white line recognition section 86. In other words, $w_3$ is a distance from a left end of the image to a left end of the Boundary Box (corresponding to a left end of the white line WL1), $w_4$ is a width dimension of the Boundary Box (corresponding to a width dimension of the white line WL1), $w_5$ is a distance from a right end of the image to a right end of the Boundary Box (corresponding to a right end of the white line WL1) and $h_3$ is a distance from a lower end of the image to a lower end of the Boundary Box (corresponding to an edge on the near side of the white line WL1).

In a case where g is a function that detects the crosswalk CW and the traffic light TL using deep learning, if $g(X_t)$ is Boundary Boxes for the crosswalk CW and the traffic light TL, the Boundary Boxes being estimated using an image $X_t \in R^{w0\times h0}$ taken by the camera 20 at the time t, a feature value necessary for aiding the visually impaired person's walking can be expressed as Expression (1) below:

[Expression 1]

$$j(t)=\{w_3^t, w_4^t, w_5^t, h_3^t, r^t, b^t\}^T=\phi \circ g(X_t) \tag{1}$$

Here,

[Expression 2]

$$\phi: R^{p1\times 4} \mapsto R^6 \tag{2}$$

The above is an operator that extracts the feature value j(t) above and is provided to perform post-processing on $g(X_t)$ above, and p1 is a maximum number of Boundary Boxes per frame.

State Transition Function

Next, the state transition functions will be described. As described above, the state transition functions are used for determining whether or not the respective conditions for providing the stop instruction ($y_t=1$), the walk instruction ($y_t=2$), the right deviation warning ($y_t=3$) and the left deviation warning ($y_t=4$) are met.

A state quantity (state variable) $s_{t+1}$ at a time t+1 can be represented by Expression (3) below using time history information for a feature value of the crosswalk CW J={j(0), j(1), j . . . (t)}, a current state quantity (state variable) $s_t$ and an image $X_{t+1}$ taken at the time t+1.

[Expression 3]

$$s_{t+1}=f(J, s_t, X_{t+1}) \tag{3}$$

The state transition function f in Expression (3) can be defined as Expression (4) below according to the state quantity at the current time.

[Expression 4]

$$f(J, s_t, X_{t+1}) = \begin{cases} f_0(J, X_{t+1}) & \text{if } s_t = 0 \text{ (Walking)} \\ f_1(J, X_{t+1}) & \text{if } s_t = 1 \text{ (Stop)} \\ f_2(J, X_{t+1}) & \text{if } s_t = 2 \text{ (Crossing)} \end{cases} \tag{4}$$

In other words, a transition of the visually impaired person's walking is a repetition of walking (for example, walking toward the crosswalk CW)→stop (for example, stop just short of the crosswalk CW)→crossing (for example, crossing the crosswalk CW)→walking (for example, walking after completion of crossing the crosswalk CW), and $f_0(J, X_{t+1})$ is a state transition function for determining whether or not a condition for providing the stop instruction ($y_t=1$) to the visually impaired person in a walking state ($s_t=0$) is met, $f_1(J, X_{t+1})$ is a state transition function for determining whether or not a condition for providing the crossing (walking) instruction ($y_t=2$) to the visually impaired person in a stop state ($s_{t=1}$) is met, and $f_2(J, X_{t+1})$ is a state transition function for determining whether or not a condition for providing notice to walk (completion of crossing) to the visually impaired person in a crossing state ($s_t=2$) is met. Also, as indicated in Expression (12) described later, $f_3(J, X_{t+1})$ is a state transition function for determining whether or not a condition for providing a warning of deviation from the crosswalk CW to the visually impaired person who is in the crossing state ($s_t=2$) is met.

The state transition functions according to the respective state quantities (state variables) will more specifically be described below.

State Transition Function Employed in Walking State

The state transition function $f_0(J, X_{t+1})$ used when the state quantity at the current time is the walking state ($s_t$=0) can be expressed by Expressions (5) to (7) below using the feature value in Expression (1) above.

[Expression 5]

$$f_0(J, X_{t+1}) = H(\alpha_1 - h_3^{t+1})H(w_4^{t+1} - \alpha_2)\times\delta\left(\sum_{i=T-t0}^{t} H(\alpha_1 - h_3^{t+1})H(w_4^{t+1} - \alpha_2)\right) \tag{5}$$

[Expression 6]

$$w_4^{t+1} = I_2^T\{\phi\circ g(X_{t+1})\} \tag{6}$$

[Expression 7]

$$h_3^{t+1} = I_4^T\{\phi\circ g(X_{t+1})\} \tag{7}$$

Here, H is a Heaviside function and δ is a delta function. Also, $\alpha_1$ and $\alpha_2$ are parameters used as determination criteria and t0 is a parameter for designating a past state to be used. Also, $I_2=\{0, 1, 0, 0, 0, 0\}^T$ and $I_4=\{0, 0, 0, 1, 0, 0\}^T$. Expression (5) is the "first state transition function" in the present disclosure (first state transition function for determining whether or not a condition for providing notice to stop walking at a position just short of the crosswalk to the user who is a walking state is met).

In a case where Expression (5) is used, "1" is obtained only in a case where a condition of $\alpha_1>h_3$ and $w_4>\alpha_2$ is not met for past t0 time and the condition is first met at the time t+1, and "0" is obtained in other cases. In other words, "1" is obtained in a case where it is determined that the nearest white line WL1 (lower end of the Boundary Box of the white line) of the crosswalk CW is located at the feet of the visually impaired person as a result of $\alpha_1>h_3$ being met and it is determined that the white line WL1 extends in a direction orthogonal to a direction of travel of the visually impaired person (width dimension of the Boundary Box of the white line exceeds a predetermined dimension) as a result of $w_4>\alpha_2$ being met.

In this way, in a case where "1" is obtained in Expression (5), it is determined that the condition for providing the stop instruction ($y_t$=1) is met and the stop instruction (for example, a stop instruction to stop walking just short of the crosswalk CW; stop notice) to the visually impaired person who is in the walking state is performed.

Also, in the present embodiment, the condition for determining that the crosswalk CW is located at the feet of the visually impaired person including not only $\alpha_1>h_3$) but also a restriction on a width of the detected crosswalk CW ($w_4>\alpha_2$) prevents erroneous detection where the image $X_{t+1}$ includes a crosswalk other than the crosswalk CW present in the direction of travel of the visually impaired person (e.g., a crosswalk extending in a direction orthogonal to the direction of travel of the visually impaired person at the intersection). In other words, even in a case where there are a plurality of crosswalks, respective directions of crossing the crosswalks being different from each other, at, e.g., an intersection of roads, it is possible to clearly distinguish between the crosswalk CW to be crossed by the visually impaired person (crosswalk CW recognized as the width dimension of the white line WL1 being relatively large based on the point that the white line WL1 extends in a direction crossing a direction in which the visually impaired person crosses the crosswalk CW) and another crosswalk (crosswalk recognized as a width dimension of a white line being relatively small), enabling correctly providing notice to start crossing to the visually impaired person with high accuracy.

State Transition Function Employed in Stop State

The state transition function $f_1(J, X_{t+1})$ used in a case where the state quantity at a previous time is the stop state ($s_t$=1) can be represented by Expressions (8) to (10) below.

[Expression 8]

$$f_1(J, X_{t+1}) = b^{t+1}\delta\left(\sum_{t=t-t0}^{t} r^i\right) \tag{8}$$

[Expression 9]

$$b^{t+1} = I_6^T\{\phi\circ g(X'_{t+1})\} \tag{9}$$

[Expression 10]

$$r^{t+1} = I_5^T\{\phi\circ g(X'_{t+1})\} \tag{10}$$

Here, $X'_{t+1}$ is one obtained by the aforementioned image $X_{t+1}$ being subjected to trimming and enlargement processing. In other words, the image $X'_{t+1}$ is an image with accuracy in recognition of the traffic light TL sufficiently enhanced. Also, $I_5=\{0, 0, 0, 0, 1, 0\}^T$ and $I_6=\{0, 0, 0, 0, 0, 1\}^T$. Expression (8) corresponds to the "second state transition function" in the present disclosure (second state transition function for determining whether or not a condition for providing notice to start crossing the crosswalk to the user who is in a stop state at the position just short of the crosswalk is met).

In Expression (8), "1" is obtained only in a case where the green light is first detected at a time t+1 after the red signal being detected past t0 time, and "0" is obtained in other cases.

In this way, in a case where "1" is obtained in Expression (8), it is determined that the condition for providing the walking (crossing) instruction ($y_t$=2) is met, and the crossing instruction (for example, an instruction or notice to cross the crosswalk) is provided to the visually impaired person who is in the stop state.

Also, at a crosswalk in an intersection with no traffic light, no state transition according to the above-described logic can be performed. In order to solve this problem, it is possible to introduce a new parameter t1>t0, and if it is determined that there has been no state transition from the stop state for time t1, make the state transition to the walking state.

State Transition Function Employed in Crossing State

The state transition function $f_2(J, X_{t+1})$ used in a case where the state quantity at a previous time is the crossing state ($s_t$=2) can be represented by Expression (11) below.

[Expression 11]

$$f_2(J, X_{t+1}) = \delta\left(\sum_{i=t-t0}^{t+1} \left(b^i + r^i + H(\alpha_1 - h_3^i)H(w_4^i - \alpha_2)\right)\right) \tag{11}$$

Expression (11) corresponds to the "fourth state transition function" in the present disclosure (fourth state transition function for determining whether or not a condition for providing notice of completion of crossing the crosswalk to the user who is in a state of crossing the crosswalk is met).

In Expression (11), "1" is obtained only in a case where neither a traffic light nor a crosswalk CW at the foot has been detected at all during a time period from a past time t−t0 to a current time t+1, and "0" is obtained in other cases. In other words, "1" is obtained only in a case where neither a traffic light TL nor a crosswalk CW at the foot can be detected because of completion of crossing a crosswalk CW.

In this way, in a case where "1" is obtained in Expression (11), it is determined that the condition for providing notice of completion of crossing is met, and notice of completion of crossing (completion of crossing a crosswalk) is provided to the visually impaired person in the walking state.

State Transition Function for Determining Deviation from Crosswalk

The state transition function $f_3(J, X_{t+1})$ for determining deviation from the crosswalk CW during the visually impaired person crossing the crosswalk CW can be represented by Expressions (12) to (14) below.

[Expression 12]

$$f_3(J, X_{t+1}) = H\left(\frac{\max(w_3^{t+1}, w_5^{t+1})}{w_0} - \alpha_3\right) \tag{12}$$

[Expression 13]

$$w_3^{t+1} = I_1^T\{\phi \circ g(X_{t+1})\} \tag{13}$$

[Expression 14]

$$w_5^{t+1} = I_3^T\{\phi \circ g(X_{t+1})\} \tag{14}$$

Here, $\alpha_3$ is a parameter used as a determination criterion. Also, $I_1=\{1, 0, 0, 0, 0, 0\}^T$ and $I_3=\{0, 0, 1, 0, 0, 0\}^T$. Expression (12) corresponds to the "third state transition function" in the present disclosure (third state transition function for determining whether or not a condition for providing warning of deviation from the crosswalk to the user in a state of crossing the crosswalk is met).

In Expression (12), "1" is obtained in a case where an amount of deviation of a position of the detected crosswalk CW from a center of a frame is an allowable amount or more, and "0" is obtained in other cases. In other words, "1" is obtained in a case where a value of $w_3$ exceeds a predetermined value (left deviation) or where a value of $w_5$ exceeds a predetermined value (right deviation).

If "1" is obtained in Expression (12) in this way, the right deviation warning ($y_t=3$) or the left deviation warning ($y_t=4$) is provided.

Walking Aid Operation

Next, a flow of walking aid operation of the walking aid system 10 will be described.

Figure 13:
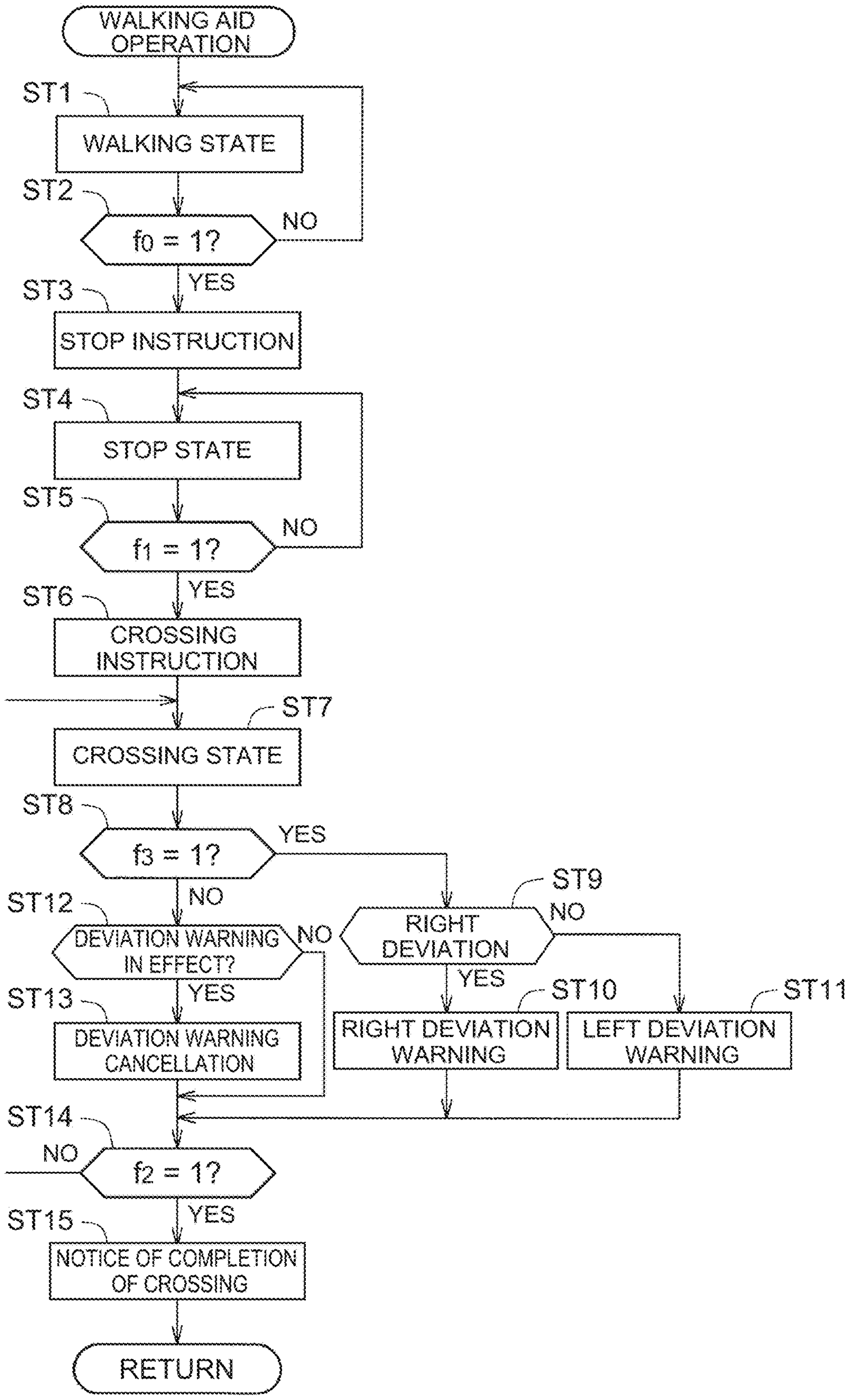
FIG. 13 is a flowchart illustrating a procedure of a walking aid operation of a walking aid system.

FIG. 13 is a flowchart illustrating a flow of a sequence of the above walking aid operation. This flowchart is repeated at a predetermined time interval so that one routine is executed during a time from a predetermined time t to a predetermined time t+1 in a situation in which a visually impaired person is walking on a road (sidewalk). In the below description, indication of a variable $(J, X_{t+1})$ in each state transition function is omitted.

First, in step ST1, a visually impaired person is in the walking state, and in step ST2, whether or not "1" is obtained in the state transition function $f_0$(Expression 5) for determining whether or not the above-described condition for providing the stop instruction ($y_t=1$) is met is determined based on a position of a white line WL1 of a crosswalk CW in an image area including the crosswalk CW, the position being recognized by the white line recognition section 86 (more specifically, a position of a Boundary Box of a nearest white line WL1).

If "0" is obtained in the state transition function $f_0$, determination of "NO" is made because the condition for providing the stop instruction ($y_t=1$) is not met, that is, the visually impaired person has not yet reached just short of the crosswalk CW, and the operation returns to step ST1. Since determination of "NO" is made in step ST2 until the visually impaired person reaches just short of the crosswalk CW, the operation in steps ST1 and ST2 is repeated.

If the visually impaired person reaches just short of the crosswalk CW and "1" is obtained in the state transition function $f_0$, determination of "YES" is made in step ST2 and the operation proceeds to step ST3. In step ST3, the stop instruction ($y_t=1$) is provided to the visually impaired person. Specifically, the vibration generator 50 of the white cane 1 held by the visually impaired person vibrates in a pattern indicating the stop instruction (stop notice). Consequently, the visually impaired person grasping the grip portion 3 of the white cane 1 recognizes that the stop instruction has been provided by feeling the pattern of the vibration of the vibration generator 50, and stops walking.

In step ST4, the visually impaired person is in the stop state, and in step ST5, whether or not "1" is obtained in the state transition function $f_1$ (Expression 8) for determining whether or not the condition for providing the walk instruction ($y_t=2$) is met is determined. In the determination operation according to the state transition function as described above with reference to FIG. 9, an area A surrounded by dashed lines is extracted and the area A is subjected to enlargement processing, and the image illustrated in FIG. 10 is thereby obtained, enabling easy determination of a status of a traffic light TL. This operation corresponds to operation of the image processing section (image processing section that extracts the image area including the traffic light and performs enlargement processing of the extracted image area) 83 and the traffic light determination section (traffic light determination section that determines whether a status of the traffic light is in a stop instruction state or a crossing permission state from information of the image area including the traffic light, the image area being subjected to the enlargement processing) 84.

If "0" is obtained in the state transition function $f_1$, determination of "NO" is made because the condition for providing the walk instruction ($y_t=2$) is not met, that is, the traffic light TL has not yet switched to green, and the operation returns to step ST4. Since determination of "NO" is made in step ST5 until the traffic light TL switches to green, the operation in steps ST4 and ST5 is repeated.

If "1" is obtained in the state transition function $f_1$ as a result of the traffic light TL switching to green, determination of "YES" is made in step ST5 and the operation proceeds to step ST6. This operation corresponds to operation of the traffic light determination section (traffic light determination section that determines whether a status of the traffic light is in a stop instruction state or a crossing permission state from information of the image area including the traffic light, the image area being subjected to the enlargement processing) 84 and the switching recognition section (switching recognition section that recognizes switching of the status of the traffic light from the stop instruction state to the crossing permission state) 85.

In step ST6, the walk instruction ($y_t=2$) is provided to the visually impaired person. Specifically, the vibration generator 50 of the white cane 1 held by the visually impaired person vibrates in a pattern indicating the walk instruction (crossing start notice). Consequently, the visually impaired person grasping the grip portion 3 of the white cane 1 recognizes the provision of the walk instruction and starts crossing the crosswalk CW.

In step ST7, the visually impaired person is in a state of crossing the crosswalk CW, and in step ST8, whether or not "1" is obtained in the state transition function $f_3$ for determining whether or not the condition for providing a warning of deviation from the crosswalk CW is met (Expression 12) is determined.

If determination of "YES" is made in step ST8 as a result of "1" being obtained in the state transition function $f_3$, in step ST9, whether or not a direction of the deviation from the crosswalk CW is a rightward direction (right deviation) is determined. Then, if the direction of the deviation from the crosswalk CW is the rightward direction and determination of "YES" is thus made in step ST9, the operation proceeds to step ST10, and the right deviation warning ($y_t$=3) is provided to the visually impaired person. Specifically, the vibration generator 50 of the white cane 1 held by the visually impaired person vibrates in a pattern indicating the right deviation warning. Consequently, the visually impaired person grasping the grip portion 3 of the white cane 1 recognizes the provision of the right deviation warning and changes the walking direction leftward.

On the other hand, if the direction of the deviation from the crosswalk CW is a leftward direction and determination of "NO" is made in step ST9, the operation proceeds to step ST11 and the left deviation warning ($y_t$=4) is provided to the visually impaired person. Specifically, the vibration generator 50 of the white cane 1 held by the visually impaired person vibrates in a pattern indicating the left deviation warning. Consequently, the visually impaired person grasping the grip portion 3 of the white cane 1 recognizes the provision of the left deviation warning and changes the direction of the walking rightward. After the provision of a deviation warning in this way, the operation proceeds to step ST14.

If there is no deviation from the crosswalk CW and "0" is thus obtained in the state transition function $f_3$, determination of "NO" is made in step ST8 and the operation proceeds to step ST12. In step ST12, whether or not the deviation warning in step ST10 or step ST11 is currently in effect is determined. If the deviation warning is not in effect and determination of "NO" is thus made in step ST12, the operation proceeds to step ST14. On the other hand, if the deviation warning is in effect and determination of "YES" is thus made in step ST12, the operation proceeds to step ST13, and the deviation warning is cancelled and the operation proceeds to step ST14.

In step ST14, whether or not "1" is obtained in the state transition function $f_2$ (Expression 11) for determining the condition for providing notice of completion of the crossing is met is determined.

If "0" is obtained in the state transition function $f_2$, it is determined that the condition for providing notice of completion of crossing is not met, that is, the visually impaired person is still crossing the crosswalk CW and determination of "NO" is thus made and the operation proceeds to step ST7. Since determination of "NO" is made in step ST14 until crossing the crosswalk CW is completed, the operation in steps ST7 to ST14 is repeated.

In other words, operation of if deviation from the crosswalk CW occurs during the visually impaired person crossing the crosswalk CW, providing the above-described deviation warning and if the deviation is eliminated, cancelling the deviation warning is performed until completion of crossing of the crosswalk CW.

If the visually impaired person completes crossing the crosswalk CW and "1" is thus obtained in the state transition function $f_2$, determination of "YES" is made in step ST14, the operation proceeds to step ST15 and notice of completion of crossing is provided to the visually impaired person. Specifically, the vibration generator 50 of the white cane 1 held by the visually impaired person vibrates in a pattern indicating completion of crossing. Consequently, the visually impaired person grasping the grip portion 3 of the white cane 1 recognizes the provision of the notice of completion of crossing and returns to a normal walking state.

In this way, each time the visually impaired person crosses a crosswalk CW, the above-described operation is repeated.

Effects of Embodiment

As described above, in the present embodiment, an image area including a traffic light TL in an image taken by the camera 20 is determined, and the determined image area including the traffic light TL is extracted and enlargement processing of the extracted image area is performed to determine whether a status of the traffic light TL is red (stop instruction state) or green (crossing permission state), and notice to start crossing is provided to a visually impaired person under the condition that the status of the traffic light TL switches from red to green. Therefore, even with image information from the single camera 20 alone, accuracy in recognition of the traffic light TL can sufficiently be enhanced. As a result, it is possible to properly provide crossing start notice to a visually impaired person without an increase in configuration complexity and weight of the system.

Also, in the present embodiment, notice to start crossing is provided to the visually impaired person under the condition that the status of the traffic light TL switches from red to green. Therefore, when the visually impaired person crosses the crosswalk CW, time during which the status of the traffic light TL is green can sufficiently be secured.

Also, in the present embodiment, the walking aid system 10 is implemented in the white cane 1 alone by the components of the walking aid system 10 being incorporated in the white cane 1, enabling provision of the walking aid system 10 that is highly practical.

Other Embodiments

Note that the present disclosure is not limited to the above embodiment and all alterations and applications falling within in the scope of the claims and a scope that is equivalent to that scope are possible.

For example, the above embodiment has been described in terms of the case where the walking aid system 10 is incorporated in the white cane 1 that a visually impaired person uses. The present disclosure is not limited to this case and is applicable to, e.g., a cane or a cart used in a case where a user is an elderly person.

Also, in the above embodiment, the white cane 1 is equipped with the charging socket 70 to charge the battery (secondary battery) 60 with electric power from a household power source. The present disclosure is not limited to this example, and a photovoltaic sheet may be attached to a surface of a white cane 1 and a battery 60 may be charged with electric power generated via the photovoltaic sheet.

Also, a primary battery may be used instead of the secondary battery. Also, a pendulum electric power generator may be incorporated in a white cane 1 and a battery 60 may be charged with electric power using the pendulum electric power generator.

Also, in the above embodiment, kinds of notices are distinguished by patterns of vibration of the vibration generator 50. The present disclosure is not limited to this example and notices may be provided via sounds.

The present disclosure is applicable to a walking aid system that provides notice to start crossing a crosswalk to a visually impaired person who is walking.

What is claimed is:

1. A walking aid system that at least provides notice to start crossing to a user for the user to cross a crosswalk, the walking aid system comprising:

an image acquisition section capable of acquiring an image including both a white line closest to the user from among white lines of the crosswalk and a traffic light located ahead of the user when the user reaches the crosswalk;

a determination section that determines an image area including the crosswalk and an image area including the traffic light in the image acquired by the image acquisition section;

an image processing section that extracts the image area including the traffic light, the image area being determined by the determination section, and performs enlargement processing of the extracted image area;

a traffic light determination section that determines whether or not a status of the traffic light is a stop instruction state or a crossing permission state from information of the image area including the traffic light, the image area being subjected to the enlargement processing by the image processing section;

a switching recognition section that recognizes switching of the status of the traffic light, the status being determined by the traffic light determination section, from the stop instruction state to the crossing permission state;

a notification section that provides notice to start crossing to the user under a condition that the status of the traffic light, the status being recognized by the switching recognition section, switches from the stop instruction state to the crossing permission state; and a white line recognition section that recognizes the white lines of the crosswalk in the image area including the crosswalk, the image area being determined by the determination section, wherein the notification section provides notice to stop walking to the user under a condition that a position of a nearest white line of the crosswalk from among the white lines recognized by the white line recognition section reaches a position that is a predetermined distance from the user.

2. The walking aid system according to claim 1, wherein the white line recognition section is configured to, when a width dimension of the white line in the image acquired by the image acquisition section exceeds a predetermined dimension, recognize the white line as a white line of the crosswalk to be crossed by the user.

3. The walking aid system according to claim 1, comprising a storage section that stores a first state transition function for determining whether or not a condition for providing notice to stop walking at a position just short of the crosswalk to the user who is in a walking state is met, a second state transition function for determining whether or not a condition for providing notice to start crossing the crosswalk to the user who is in a stop state at the position just short of the crosswalk is met, a third state transition function for determining whether or not a condition for providing warning of deviation from the crosswalk to the user who is in a state of crossing the crosswalk is met, and a fourth state transition function for determining whether or not a condition for providing notice of completion of crossing the crosswalk to the user who is in a state of crossing the crosswalk is met, wherein the notification section is configured to, when the condition according to any of the state transition functions is met, provide notice according to the met condition to the user.

4. The walking aid system according to claim 1, wherein the notification section is incorporated in a white cane that a visually impaired person uses and is configured to provide notice to the visually impaired person using the white cane via vibration or sound.

5. The walking aid system according to claim 4, wherein the image acquisition section, the determination section, the image processing section, the traffic light determination section, the switching recognition section and the notification section are each incorporated in the white cane.

* * * * *